United States Patent
Kang

(10) Patent No.: US 11,341,285 B2
(45) Date of Patent: May 24, 2022

(54) INTEGRATED CIRCUIT DEVICE AND OPERATING METHOD OF INTEGRATED CIRCUIT DEVICE

(71) Applicant: SAMSUNG ELECTRONICS CO., LTD., Suwon-si (KR)

(72) Inventor: Gijin Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 16/256,907

(22) Filed: Jan. 24, 2019

(65) Prior Publication Data

US 2019/0347448 A1    Nov. 14, 2019

(30) Foreign Application Priority Data

May 9, 2018 (KR) .......... 10-2018-0053296

(51) Int. Cl.
*G06F 21/79* (2013.01)
*G06F 12/14* (2006.01)
*G06F 21/72* (2013.01)

(52) U.S. Cl.
CPC .......... *G06F 21/79* (2013.01); *G06F 12/1408* (2013.01); *G06F 21/72* (2013.01); *G06F 2211/007* (2013.01)

(58) Field of Classification Search
CPC ...... G06F 21/72; G06F 21/79; G06F 12/1408; G06F 2211/007
See application file for complete search history.

(56) References Cited

U.S. PATENT DOCUMENTS

| | | |
|---|---|---|
| 7,130,977 B1 | 10/2006 | Christie et al. |
| 9,021,316 B2 | 4/2015 | Bancel |
| 9,054,859 B1 | 6/2015 | Streicher et al. |
| 9,104,890 B2 | 8/2015 | Riou |
| 9,304,944 B2 | 4/2016 | Pong et al. |
| 10,824,737 B1 * | 11/2020 | Guyomarc'h ......... H04L 9/0869 |
| 2005/0021469 A1 | 1/2005 | Han |
| 2005/0262320 A1 * | 11/2005 | Kondo ............... G06F 9/30141 |
| | | 711/163 |
| 2007/0124628 A1 * | 5/2007 | Price ............... G11C 29/56008 |
| | | 714/718 |
| 2009/0113217 A1 | 4/2009 | Dolgunov et al. |

(Continued)

FOREIGN PATENT DOCUMENTS

KR    101665600 B1    10/2016
KR    20170108332 A    9/2017

*Primary Examiner* — Thaddeus J Plecha
(74) *Attorney, Agent, or Firm* — Volentine, Whitt & Francos, PLLC

(57) ABSTRACT

An integrated circuit device includes a shuffler, a logic unit and registers each including two or more bit storages. The shuffler receives an address indicating one of the registers and data bits, selects target bit storages at which the data bits are to be stored from among bit storages of the registers depending on a shuffle configuration and the address, stores the data bits into the target bit storages, and transfers the data bits from the target bit storages depending on the shuffle configuration. The logic unit receives the data bits transferred from the shuffler and operates using the received data bits. The shuffle configuration is adjusted when a reset operation is performed.

12 Claims, 19 Drawing Sheets

(56) References Cited

U.S. PATENT DOCUMENTS

| | | | |
|---|---|---|---|
| 2011/0222684 A1* | 9/2011 | Liardet | G06F 21/75 380/28 |
| 2013/0205139 A1* | 8/2013 | Walrath | G06F 21/72 713/190 |
| 2015/0161059 A1 | 6/2015 | Durham et al. | |
| 2017/0046101 A1* | 2/2017 | Kersh | G06T 1/60 |
| 2017/0046537 A1 | 2/2017 | Ahn et al. | |
| 2018/0139039 A1* | 5/2018 | Liu | H04L 9/0869 |
| 2019/0384938 A1* | 12/2019 | Gu | H04L 63/04 |

* cited by examiner

FIG. 6

| RN | AD | AD_C | State |
|----|----|------|-------|
| 00 | 00 | 00 | S1 |
|    | 01 | 01 |    |
|    | 10 | 10 |    |
|    | 11 | 11 |    |
| 01 | 00 | 01 | S2 |
|    | 01 | 00 |    |
|    | 10 | 11 |    |
|    | 11 | 10 |    |
| 10 | 00 | 10 | S3 |
|    | 01 | 11 |    |
|    | 10 | 00 |    |
|    | 11 | 01 |    |
| 11 | 00 | 11 | S4 |
|    | 01 | 10 |    |
|    | 10 | 01 |    |
|    | 11 | 00 |    |

| RN | AD | AD_C | State |
|----|----|------|-------|
| 0  | 00 | 00   | S1    |
|    | 01 | 01   |       |
|    | 10 | 10   |       |
|    | 11 | 11   |       |
| 1  | 00 | 10   | S2    |
|    | 01 | 11   |       |
|    | 10 | 00   |       |
|    | 11 | 01   |       |

FIG. 13

| RN_COMP=00 | | | |
|---|---|---|---|
| RN_XOR | AD | AD_C | State |
| 00 | 00 | 00 | S1 (EXC) |
| 00 | 01 | 01 | |
| 00 | 10 | 10 | |
| 00 | 11 | 11 | |
| 01 | 00 | 01 | S2 (EXC) |
| 01 | 01 | 00 | |
| 01 | 10 | 11 | |
| 01 | 11 | 10 | |
| 10 | 00 | 10 | S3 |
| 10 | 01 | 11 | (EXC) |
| 10 | 10 | 00 | |
| 10 | 11 | 01 | |
| 11 | 00 | 11 | S4 |
| 11 | 01 | 10 | |
| 11 | 10 | 01 | |
| 11 | 11 | 00 | (EXC) |

| RN_COMP=01 | | | |
|---|---|---|---|
| RN_XOR | AD | AD_C | State |
| 00 | 00 | 00 | (EXC) S1 |
| 00 | 01 | 01 | |
| 00 | 10 | 10 | |
| 00 | 11 | 11 | |
| 01 | 00 | 01 | (EXC) |
| 01 | 01 | 00 | S2 |
| 01 | 10 | 11 | |
| 01 | 11 | 10 | |
| 10 | 00 | 10 | |
| 10 | 01 | 11 | S3 (EXC) |
| 10 | 10 | 00 | |
| 10 | 11 | 01 | |
| 11 | 00 | 11 | |
| 11 | 01 | 10 | S4 |
| 11 | 10 | 01 | (EXC) |
| 11 | 11 | 00 | |

| RN_COMP=10 | | | |
|---|---|---|---|
| RN_XOR | AD | AD_C | State |
| 00 | 00 | 00 | S1 |
| 00 | 01 | 01 | (EXC) |
| 00 | 10 | 10 | |
| 00 | 11 | 11 | |
| 01 | 00 | 01 | S2 |
| 01 | 01 | 00 | |
| 01 | 10 | 11 | (EXC) |
| 01 | 11 | 10 | |
| 10 | 00 | 10 | (EXC) |
| 10 | 01 | 11 | S3 |
| 10 | 10 | 00 | |
| 10 | 11 | 01 | |
| 11 | 00 | 11 | (EXC) |
| 11 | 01 | 10 | S4 |
| 11 | 10 | 01 | |
| 11 | 11 | 00 | |

| RN_COMP=11 | | | |
|---|---|---|---|
| RN_XOR | AD | AD_C | State |
| 00 | 00 | 00 | S1 |
| 00 | 01 | 01 | |
| 00 | 10 | 10 | (EXC) |
| 00 | 11 | 11 | |
| 01 | 00 | 01 | S2 |
| 01 | 01 | 00 | |
| 01 | 10 | 11 | |
| 01 | 11 | 10 | (EXC) |
| 10 | 00 | 10 | |
| 10 | 01 | 11 | (EXC) S3 |
| 10 | 10 | 00 | |
| 10 | 11 | 01 | |
| 11 | 00 | 11 | (EXC) S4 |
| 11 | 01 | 10 | |
| 11 | 10 | 01 | |
| 11 | 11 | 00 | |

INTEGRATED CIRCUIT DEVICE AND OPERATING METHOD OF INTEGRATED CIRCUIT DEVICE

CROSS-REFERENCE TO RELATED APPLICATIONS

A claim of priority under 35 U.S.C. § 119 is made to Korean Patent Application No. 10-2018-0053296 filed on May 9, 2018, in the Korean Intellectual Property Office, the entire content of which is hereby incorporated by reference.

BACKGROUND

The present inventive concepts herein relate to a semiconductor device, and more particularly to an integrated circuit device for improving security of received data and an operating method of the integrated circuit device.

Semiconductor devices are used in various fields, some of which require security. For example, a smart card may perform encryption and decryption using a key. The encryption or decryption may be based on the advanced encryption standard (AES).

The key may be provided to an AES engine for the purpose of performing encryption and decryption. However, the key may be leaked by means such as sideband channel attack (SCA), upon transferring the key to the AES engine. In the case where the key is leaked, the smart card may be hacked.

As such, security is required to prevent data from being leaked in the process of transferring data. The inventive concepts are directed to providing an integrated circuit device having improved security that prevents data from being leaked, and an operating method of the integrated circuit device.

SUMMARY

Embodiments of the inventive concept provide an integrated circuit device which transfers or receives data bits with improved security and an operating method of the integrated circuit device.

Embodiments of the inventive concepts provide an integrated circuit device that includes registers each including two or more bit storages; a shuffler that receives an address indicating one of the registers and data bits, selects target bit storages at which the data bits are to be stored from among bit storages of the registers depending on a shuffle configuration and the address, stores the data bits into the target bit storages, and transfers the data bits from the target bit storages depending on the shuffle configuration; and a logic unit that receives the data bits transferred from the shuffler and operates using the received data bits. The shuffle configuration is adjusted when a reset operation is performed.

Embodiments of the inventive concepts also provide an integrated circuit device that includes a processor core that outputs an address and a key including two or more data bits; a power manager that activates a reset signal when a reset operation is performed; a random number generator that generates a random number in response to the reset signal; and peripheral circuit that stores the key in response to the address and the random number and performs encryption or decryption in response to the key. The peripheral circuit includes registers each including two or more bit storages; and a shuffler that adjusts target bit storages at which the key is to be stored from among bit storages of the registers depending on the address and the random number.

Embodiments of the inventive concepts further provide an operation method of an integrated circuit device which includes registers, a shuffler, and a logic unit. The method includes receiving, by the shuffler, a random number responsive to a detected reset; receiving, by the shuffler, an address and data bits; selecting, by the shuffler, bit storages of the registers as target bit storages depending on the random number and the address; and storing, by the shuffler, the data bits into the target bit storages.

Embodiments of the inventive concepts still further provide an integrated circuit that includes registers; a random number generator that generates a random number responsive to a power reset operation; and a shuffler that receives the random number, an address and data bits having a first order. The shuffler generates converted data bits having a second order by rearranging the data bits based on the random number, selects bit storages of a register from among the registers as target bit storages based on the address, and stores the converted data bits in the target bit storages.

BRIEF DESCRIPTION OF THE FIGURES

The above and other objects and features of the inventive concepts will become apparent in view of the following detailed description of embodiments thereof with reference to the accompanying drawings.

FIG. 6 illustrates a diagram of an example in which an address is converted depending on selected bits of a random number.

FIG. 13 illustrates a diagram of an example in which an address is converted depending on a converted address and first bits and second bits selected from a random number.

DETAILED DESCRIPTION

Below, embodiments of the inventive concepts are described in detail and clearly to such an extent that one of ordinary skill in the art may easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
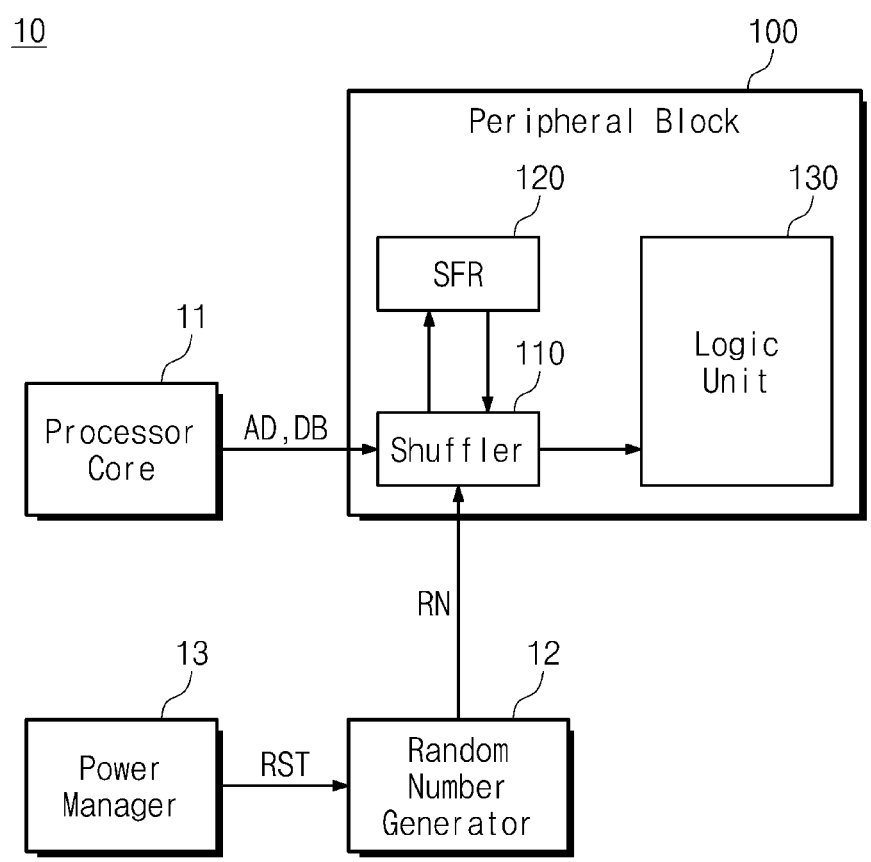
FIG. 1 illustrates a block diagram of an integrated circuit device according to an embodiment of the inventive concepts.

FIG. 1 illustrates a block diagram of an integrated circuit device 10 according to an embodiment of the inventive concepts. Referring to FIG. 1, the integrated circuit device 10 includes a processor core 11, a random number generator 12, a power manager 13, and a peripheral block 100. The processor core 11 may control the integrated circuit device 10.

The processor core 11 transfers data bits DB and an address AD indicating locations where the data bits DB will be stored, to the peripheral block 100. For example, the peripheral block 100 may be an encryption and decryption block such as an advanced encryption standard (AES) engine. The processor core 11 may transfer a key as the data bits DB to the peripheral block 100 when encryption and decryption are necessary.

The random number generator 12 generates a random number RN in response to a reset signal RST. The random number generator 12 may adjust a value of the random number RN whenever generating the random number RN. For example, the random number generator 12 may generate the random number RN by using a time of a clock (not illustrated) provided to the integrated circuit device 10 as a seed.

The power manager 13 detects a reset or power supply of the integrated circuit device 10. When the reset or power supply is detected, the power manager 13 may activate the reset signal RST to be provided to the random number generator 12.

The peripheral block 100 includes a shuffler 110, a special function register (SFR) 120, and a logic unit 130. The shuffler 110 receives the address AD and the data bits DB from the processor core 11. The address AD may indicate locations of storages, at which the data bits DB will be stored, from among storages (e.g., bit storages) of the special function register 120. In embodiments, the peripheral block 100 may be characterized as a peripheral circuit.

The shuffler 110 may adjust a shuffle configuration depending on the random number RN. The shuffler 110 selects target bit storages, at which the data bits DB will be stored, from among the bit storages of the special function register 120 depending on the shuffle configuration and the address AD.

The shuffler 110 stores the data bits DB to the target bit storages of the special function register 120. The shuffler 110 may receive the data bits DB from the target bit storages of the special function register 120 depending on the shuffle configuration and may transfer the received data bits DB to the logic unit 130.

The logic unit 130 performs a specified operation by using the data bits DB transferred from the shuffler 110. For example, the logic unit 130 may perform encryption or decryption using the data bits DB as a key.

According to an embodiment of the inventive concepts, even though a same address AD may be received at different times, locations of the special function register 120, at which the data bits DB will be stored, vary with the shuffle configuration. The shuffle configuration may be adjusted when the reset signal RST is activated. For example, the shuffler 110 may adjust the shuffle configuration when a reset operation is performed, or in other words responsive to a reset operation. Accordingly, the integrated circuit device 10 is provided as having high security which makes it possible to block a sideband channel attack (SCA) for probing a special function register (SFR) in an attempt to obtain the data bits DB.

Figure 2:
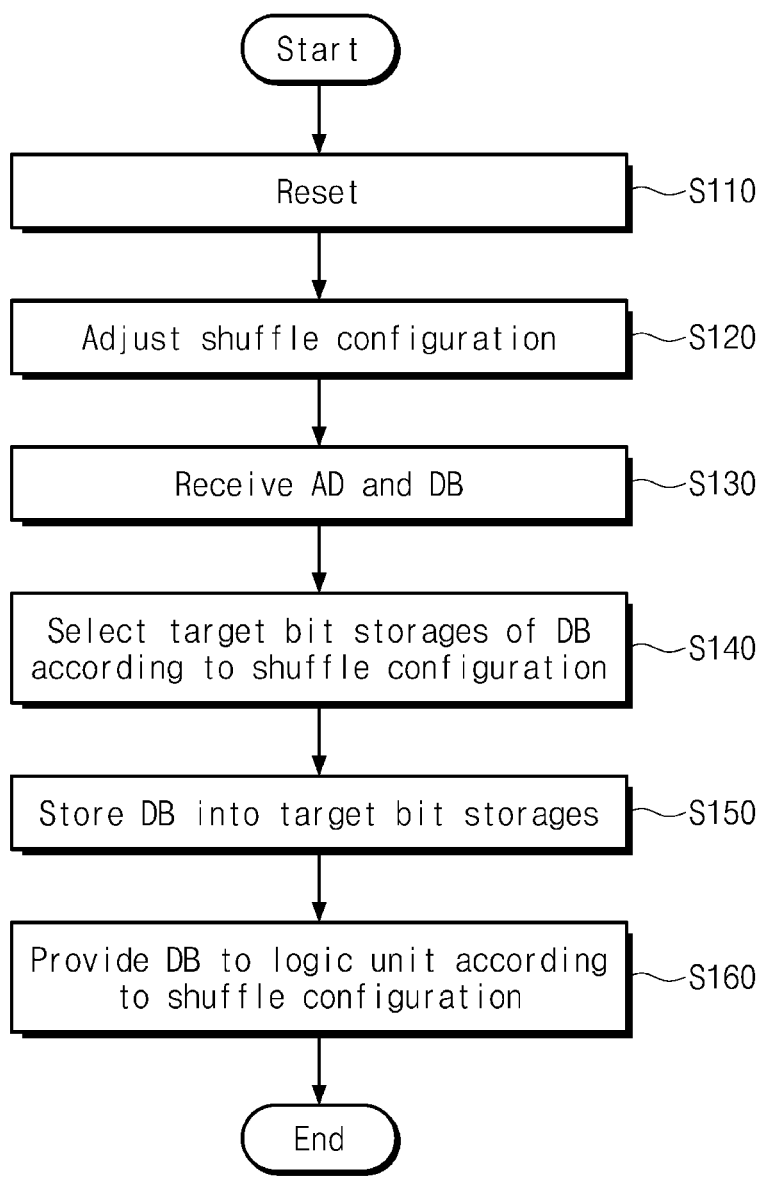
FIG. 2 illustrates a flowchart of an operating method of the integrated circuit device according to an embodiment of the inventive concepts.

FIG. 2 illustrates a flowchart of an operating method of the integrated circuit device 10 according to an embodiment of the inventive concepts. Referring to FIGS. 1 and 2, in operation S110, the integrated circuit device 10 is reset. The power manager 13 may activate the reset signal RST. The random number generator 12 may generate the random number RN in response to the activation of the reset signal RST.

In operation S120, the shuffler 110 adjusts the shuffle configuration depending on the random number RN. The shuffle configuration may include some of bits in the random number RN. In operation S130, the shuffler 110 receives the address AD and the data bits DB. In operation S140, the shuffler 110 selects target bit storages, at which the data bits DB will be stored, from among the bit storages of the special function register 120 depending on the shuffle configuration and the address AD.

In operation S150, the shuffler 110 stores the data bits DB into the target bit storages. In operation S160, the shuffler 110 provides the data bits DB transferred from the target bit storages to the logic unit 130 depending on the shuffle configuration.

Figure 3:
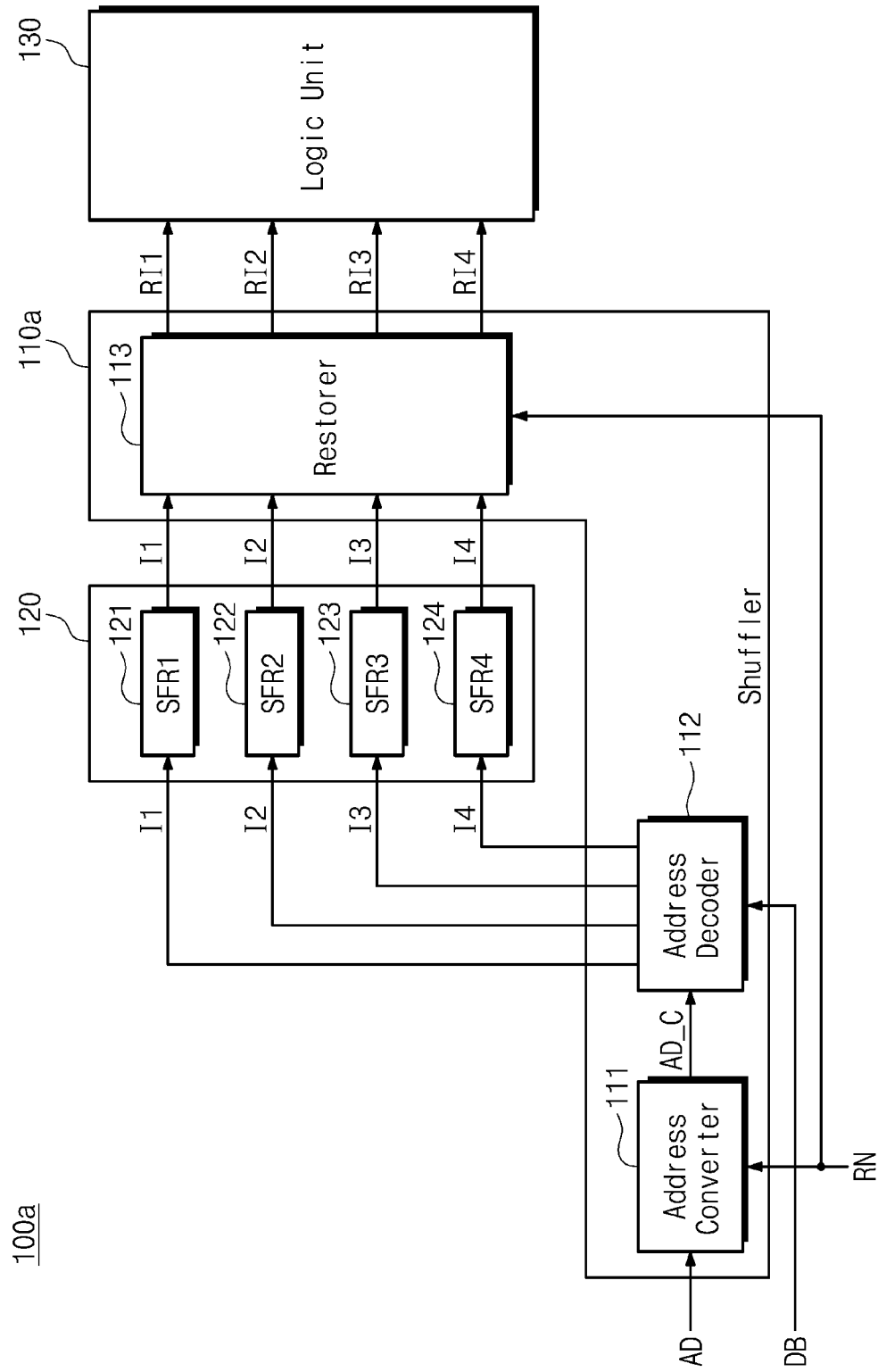
FIG. 3 illustrates a block diagram of a peripheral block according to an embodiment of the inventive concepts.

FIG. 3 illustrates a block diagram of a peripheral block 100a according to an embodiment of the inventive concepts. Referring to FIG. 3, the peripheral block 100a includes a shuffler 110a, the special function register 120, and the logic unit 130. The special function register 120 may include first to fourth registers 121 to 124. Each of the first to fourth registers 121 to 124 may include two or more bit storages. Each of the two or more bit storages may include a flip-flop.

The shuffler 110a includes an address converter 111, an address decoder 112, and a restorer 113. The address converter 111 receives the address AD and the random number RN. The address AD may indicate one of the first to fourth registers 121 to 124. The address converter 111 may convert the address AD by using the random number RN.

The converted address AD_C may indicate one of the first to fourth registers 121 to 124. The converted address AD_C may be identical to or different from the address AD. The address converter 111 may adjust target bit storages depending on the shuffle configuration by converting the address AD by using the random number RN.

The address converter 111 provides the converted address AD_C to the address decoder 112. The address decoder 112 receives the converted address AD_C and the data bits DB. The address decoder 112 provides (or stores) the data bits DB to one of the first to fourth registers 121 to 124 depending on the converted address AD_C. For example, the address decoder 112 may provide the data bits DB to one of the first to fourth registers 121 to 124 as one of first to fourth information I1 to I4.

The restorer 113 receives the random number RN. The restorer 113 outputs the first to fourth information I1 to I4 as first to fourth restored information RI1 to RI4 depending on the random number RN. The restorer 113 may adjust paths through which the first to fourth information I1 to I4 are output as the first to fourth restored information RI1 to RI4, depending on the random number RN.

The logic unit 130 may have inputs respectively corresponding to the first to fourth registers 121 to 124. The inputs are configured to receive the first to fourth restored information RI1 to RI4, respectively. The restorer 113 may adjust internal transfer paths such that the data bits DB are transferred to an input corresponding to the address AD.

For example, the data bits DB received together with the address AD indicating the first register 121 may be stored into the third register 123 as the third information I3 depending on the shuffle configuration. The restorer 113 may output the third information I3 transferred from the third register 123 as the first restored information RI1 depending on the shuffle configuration. The restorer 113 may transfer the data bits DB from target bit storages to an appropriate input of the logic unit 130 depending on the shuffle configuration by adjusting the internal transfer paths depending on the random number RN.

Figure 4:
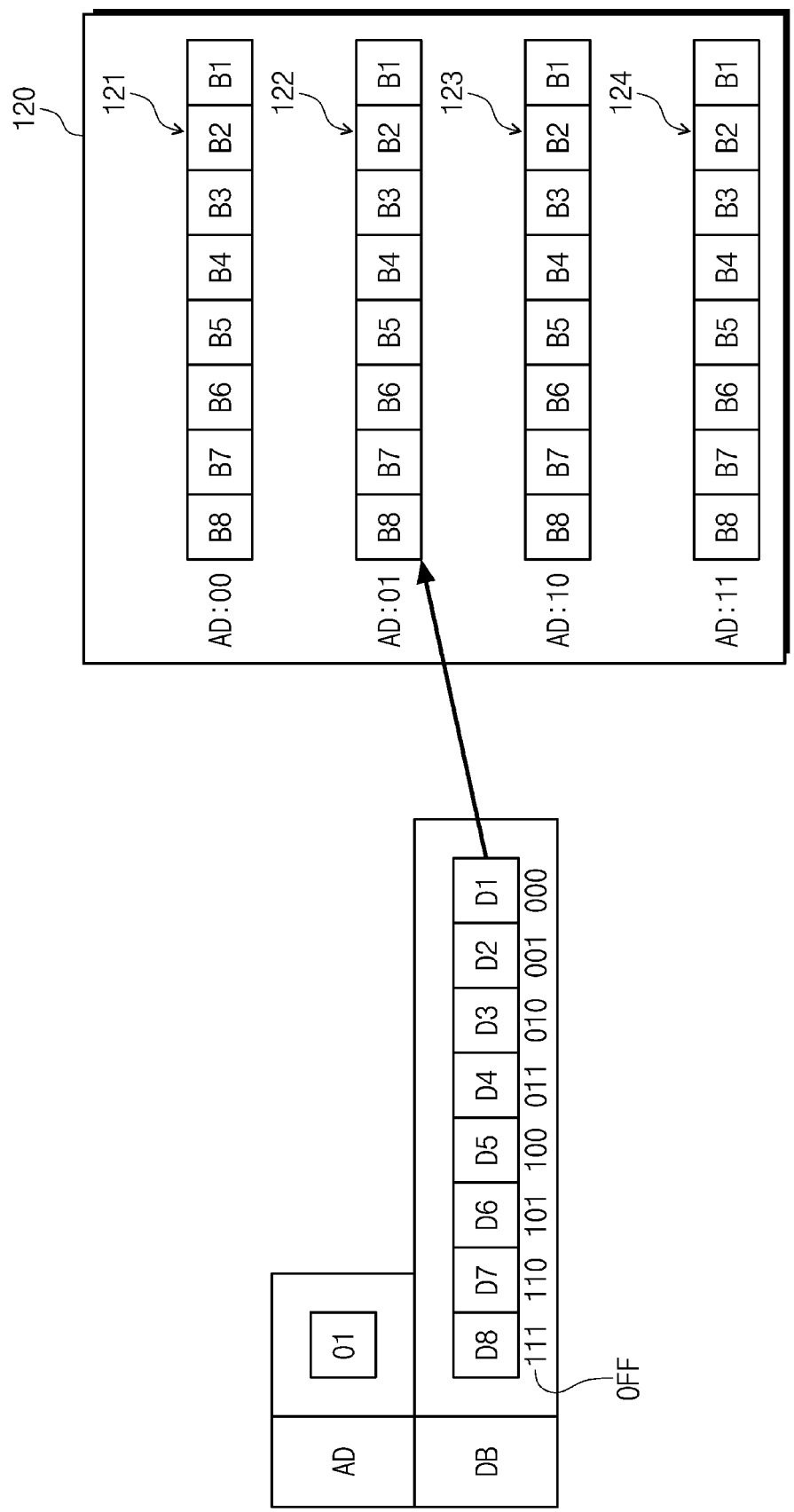
FIG. 4 illustrates a diagram of an example in which data bits are stored into a special function register when a shuffle configuration is not applied.

FIG. 4 illustrates a diagram of an example in which the data bits DB are stored into the special function register 120 when a shuffle configuration is not applied. Referring to FIG. 4, the data bits DB are received together with the address AD of "01". The data bits DB may include first to eighth bits D1 to D8.

The first to eighth bits D1 to D8 may have offset bits OFF marked by "000" to "111" depending on positions thereof. The offset bits OFF may not be a value which is included in the address AD or is included in the data bits DB. The offset bits OFF may be a temporary value specified depending on positions of the first to eighth bits D1 to D8.

As shown in the embodiment of FIG. 4, the first register 121 is specified as corresponding to the address AD of "00".

The second register 122 is specified as corresponding to the address AD of "01". The third register 123 is specified as corresponding to the address AD of "10". The fourth register 124 is specified as corresponding to the address AD of "11". Each of the first to fourth registers 121 to 124 may include first to eighth bit storages B1 to B8.

In the case where the shuffle configuration is not applied, the data bits DB are stored into the second register 122 depending on the address AD of "01". In the case where the shuffle configuration is not applied, the first to eighth bits D1 to D8 are respectively stored into the first to eighth bit storages B1 to B8. In the case where the shuffle configuration is not applied, the data bits DB associated with the address AD of "01" are always stored into the second register 122. Accordingly, the data bits DB may be prone to the sideband channel attack.

Figure 5:
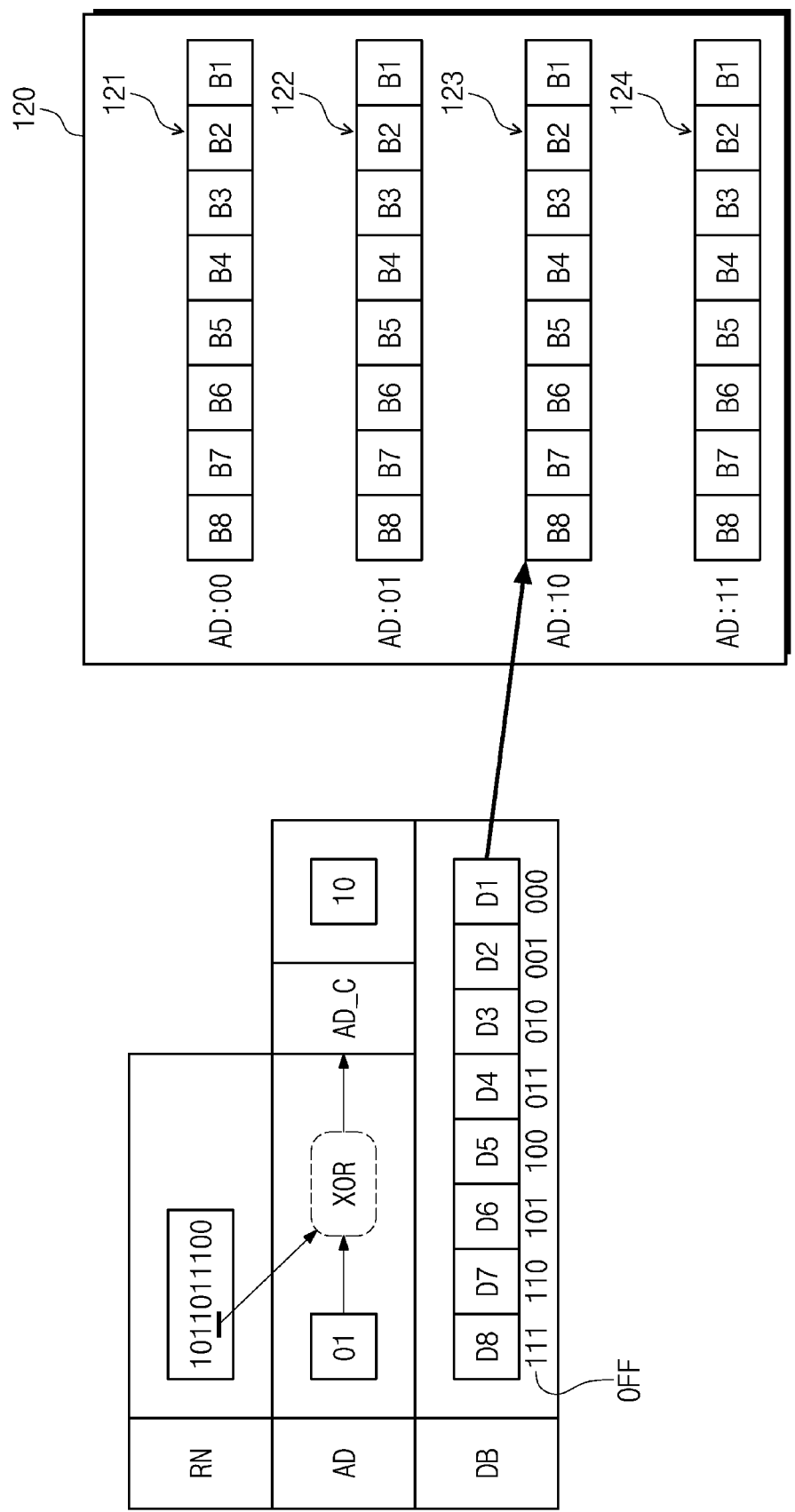
FIG. 5 illustrates a diagram of a method of storing data bits to which a shuffle configuration according to a first example is applied.

FIG. 5 illustrates a diagram of a method of storing the data bits DB to which a shuffle configuration according to a first example is applied. Referring to FIG. 5, the data bits DB are received together with the address AD of "01". The random number RN includes bits of "1011011100". A shuffle configuration includes third and fourth bits from the left side among bits of the random number RN, that is, "11".

The shuffler 110 performs an exclusive OR (XOR) operation using the address AD of "01" and the bits of "11" selected from the bits of the random number RN. A result of the XOR operation is the converted address AD_C. For example, the converted address AD_C in this example is "10". Depending on the converted address AD_C, the first to eighth bits D1 to D8 are respectively stored into the first to eighth bit storages B1 to B8 of the third register 123.

FIG. 6 illustrates a diagram of an example in which the address AD is converted depending on selected bits of the random number RN. Referring to FIGS. 3 and 6, when selected bits of the random number RN are "00", a shuffle configuration may correspond to a first state S1. In the first state S1, the address converter 111 outputs the address AD as the converted address AD_C.

When the selected bits of the random number RN are "01", the shuffle configuration corresponds to a second state S2. In the second state S2, the address converter 111 converts the addresses AD of "00", "01", "10", and "11" respectively to the converted addresses AD_C of "01", "00", "11", and "10". When the selected bits of the random number RN are "10", the shuffle configuration corresponds to a third state S3. In the third state S3, the address converter 111 converts the addresses AD of "00", "01", "10", and "11" respectively to the converted addresses AD_C of "10", "11", "00", and "01".

When the selected bits of the random number RN are "11", the shuffle configuration corresponds to a fourth state S4. In the fourth state S4, the address converter 111 converts the addresses AD of "00", "01", "10", and "11" respectively to the converted addresses AD_C of "11", "10", "01", and "00".

The random number RN is updated when the integrated circuit device 10 (refer to FIG. 1) is reset or when power is supplied to the integrated circuit device 10. That is, a state of the shuffle configuration may be changed when the integrated circuit device 10 (refer to FIG. 1) is reset or when power is supplied to the integrated circuit device 10.

Even though the same address AD may be received at different times, locations of target bit storages at which the data bits DB will be stored are changed when the integrated circuit device 10 is reset or when power is supplied to the integrated circuit device 10. Accordingly, the data bits DB may be prevented from being leaked by a sideband channel attack.

Figure 7:
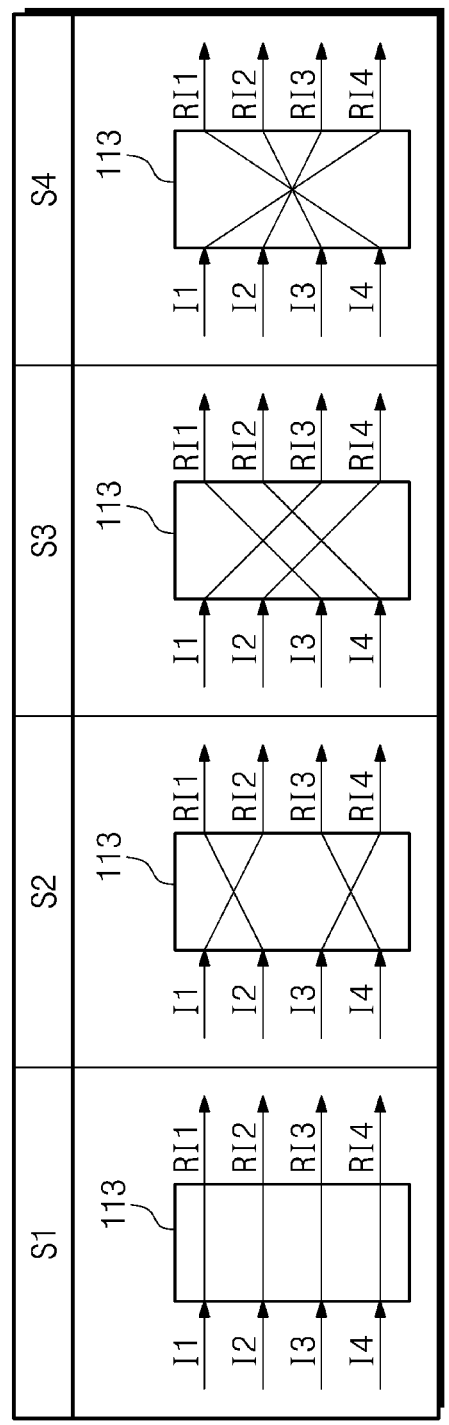
FIG. 7 illustrates a diagram of an example in which a restorer adjusts an internal transfer path depending on a shuffle configuration corresponding to FIG. 6.

FIG. 7 illustrates a diagram of an example in which the restorer 113 adjusts an internal transfer path depending on a shuffle configuration corresponding to FIG. 6. Referring to FIGS. 3 and 7, when the shuffle configuration corresponds to the first state S1, the restorer 113 output the first to fourth information I1 to I4 respectively as the first to fourth restored information RI1 to RI4.

When the shuffle configuration corresponds to the second state S2, the restorer 113 outputs the first information I1 as the second restored information RI2 and outputs the second information I2 as the first restored information RI1. Also, the restorer 113 outputs the third information I3 as the fourth restored information RI4 and outputs the fourth information I4 as the third restored information RI3.

When the shuffle configuration corresponds to the third state S3, the restorer 113 outputs the first information I1 as the third restored information RI3 and outputs the second information I2 as the fourth restored information RI4. Also, the restorer 113 outputs the third information I3 as the first restored information RI1 and output the fourth information I4 as the second restored information RI2.

When the shuffle configuration corresponds to the fourth state S4, the restorer 113 outputs the first information I1 as the fourth restored information RI4 and outputs the second information I2 as the third restored information RI3. Also, the restorer 113 outputs the third information I3 as the second restored information RI2 and outputs the fourth information I4 as the first restored information RI1.

Figure 8:
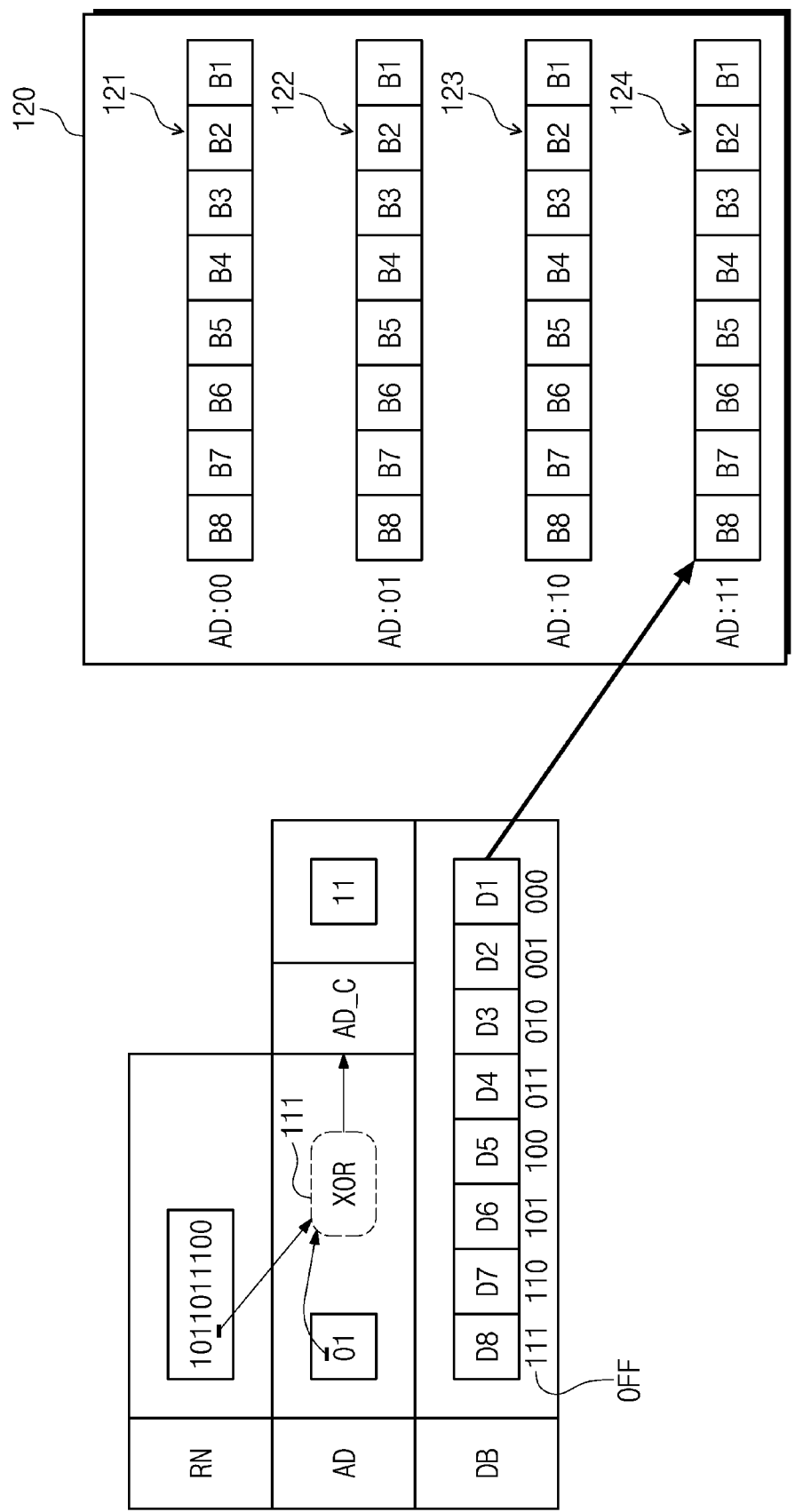
FIG. 8 illustrates a diagram of a method of storing data bits to which a shuffle configuration according to a second example is applied.

FIG. 8 illustrates a diagram of a method of storing the data bits DB to which a shuffle configuration according to a second example is applied. Compared to FIG. 5, the shuffler 110 selects one bit from the random number RN, for example, a third bit (e.g., "1") from the left side. Also, the shuffler 110 selects a part of the bits of the address AD, for example, a first bit (e.g., "0") from the left side.

The shuffler 110 performs an XOR operation (which may for example be characterized as performed by address converter 111 shown in FIG. 3) on the selected bit of the random number RN and the selected bit of the address AD. A result of the XOR operation is used to replace the selected bit of the address AD. A result of the replacement operation is the converted address AD_C. For example, the converted address AD_C in this example is "11". The data bits DB are stored into the fourth register 124 depending on the address AD.

Figures 9, 10:
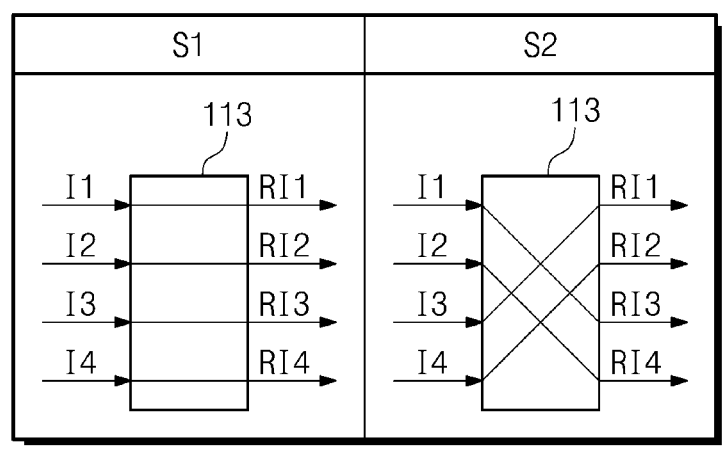
FIG. 9 illustrates a diagram of an example in which an address is converted depending on a selected bit of a random number.
FIG. 10 illustrates a diagram of an example in which a restorer adjusts an internal transfer path depending on a shuffle configuration corresponding to FIG. 9.

FIG. 9 illustrates a diagram of an example in which the address AD is converted depending on a selected bit of the random number RN. Referring to FIGS. 3 and 9, when a selected bit of the random number RN is "0", a shuffle configuration corresponds to the first state S1. In the first state S1, the address converter 111 outputs the address AD as the converted address ADS. When the selected bit of the random number RN is "1", the shuffle configuration corresponds to a second state S2. The second state S2 may be identical to the third state S3 described with reference to FIG. 6.

FIG. 10 illustrates a diagram of an example in which the restorer 113 adjusts an internal transfer path depending on a shuffle configuration corresponding to FIG. 9. Referring to FIGS. 3 and 10, when the shuffle configuration corresponds to the first state S1, the restorer 113 outputs the first to fourth information I1 to I4 respectively as the first to fourth restored information RI1 to RI4.

When the shuffle configuration corresponds to the second state S2, the restorer 113 outputs the first information I1 as the third restored information RI3 and outputs the second information I2 as the fourth restored information RI4. Also, the restorer 113 outputs the third information I3 as the first restored information RI1 and outputs the fourth information I4 as the second restored information RI2.

Compared with the shuffle configuration described with reference to FIGS. 5 to 7, the shuffle configuration described with reference to FIGS. 8 to 10 performs a limited conversion operation. Compared with the restorer 113 of FIG. 7, the restorer 113 of FIG. 10 has states, the number of which is reduced. Accordingly, complexity, size, and manufacturing costs of the restorer 113 are reduced.

Figure 11:
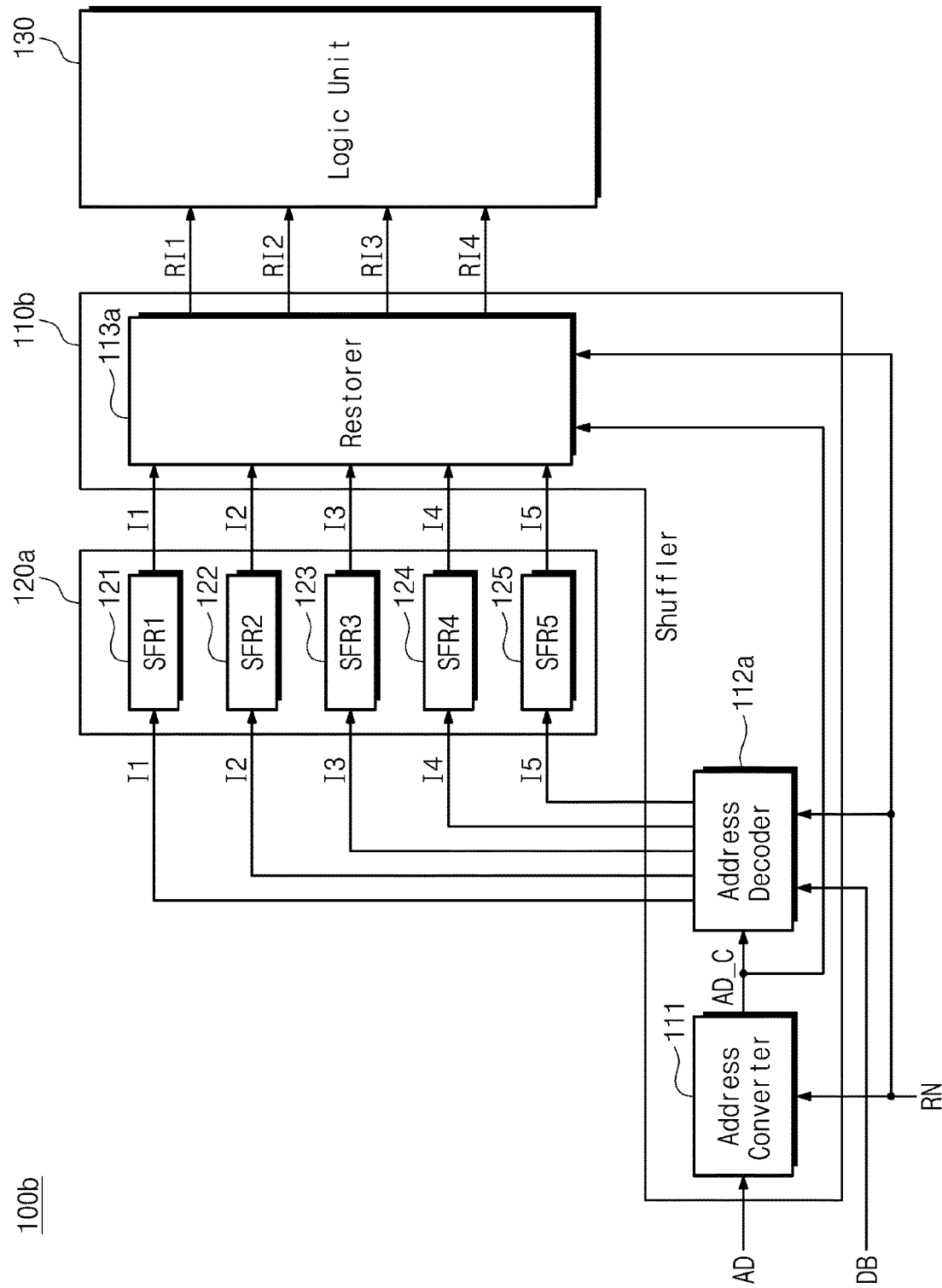
FIG. 11 illustrates a block diagram of a peripheral block according to an embodiment of the inventive concepts.

FIG. 11 illustrates a block diagram of a peripheral block 100*b* according to an embodiment of the inventive concepts. Referring to FIG. 11, the peripheral block 100*b* includes a shuffler 110*b*, a special function register 120*a*, and the logic unit 130. The logic unit 130 may be identical to the logic unit 130 of FIG. 3.

The special function register 120*a* includes first to fifth registers 121 to 125. The address AD may not be specified with regard to at least one register of the first to fifth registers 121 to 125, for example the fifth register 125. In other words, in an embodiment the fifth register 125 is not assigned to a range of the address AD. The fifth register 125 may be characterized as a dummy register including dummy bit storages. The fifth register 125 may be used to improve the security of the data bits DB.

The shuffler 110*a* includes the address converter 111, an address decoder 112*a*, and a restorer 113*a*. The operation and the configuration of the address converter 111 may be substantially identical to the address converter 111 of FIG. 3. As compared with the address decoder 112 of FIG. 3, the address decoder 112*a* further receives the random number RN. The address decoder 112*a* further adjusts locations at which the data bits DB will be stored, depending on the shuffle configuration.

The address decoder 112*a* provides the data bits DB to one of the first to fifth registers 121 to 125 as one of first to fifth information I1 to I5, depending on the converted address AD_C and the random number RN. The restorer 113*a* outputs the first to fifth information I1 to I5 transferred from the first to fifth registers 121 to 125 to the logic unit 130 as the first to fourth restored information RI1 to RI4.

Figure 12:
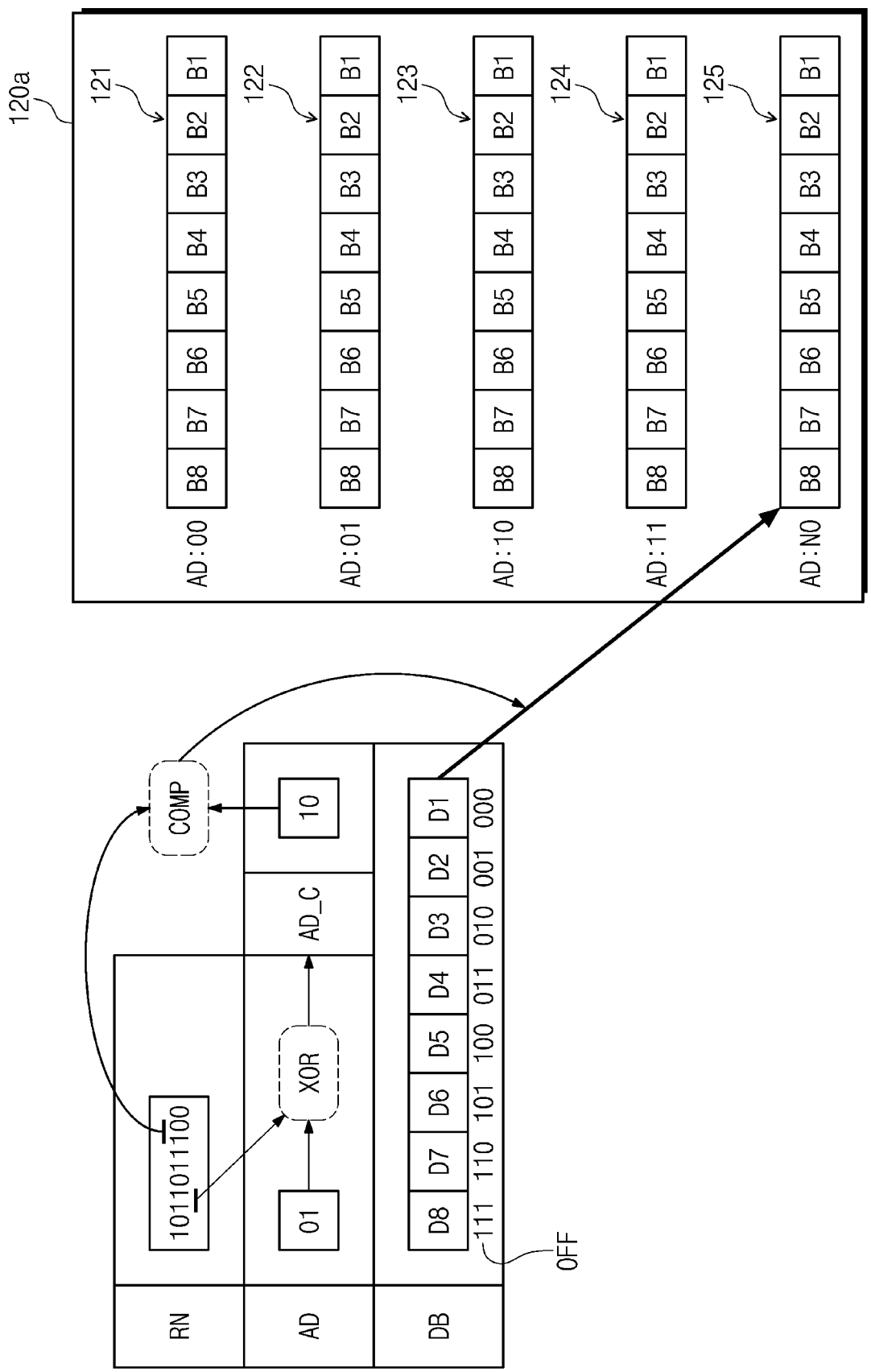
FIG. 12 illustrates a diagram of a method of storing data bits to which a shuffle configuration according to a third example is applied.

FIG. 12 illustrates a diagram of a method of storing the data bits DB to which a shuffle configuration according to a third example is applied. Referring to FIGS. 11 and 12, the address AD of this example is "01". As described with reference to FIG. 5, the address converter 111 performs an XOR operation on bits (e.g., first bits) selected from the random number RN and the address AD.

The converted address AD_C in this example is "10". The address decoder 112*a* refers to second bits selected from the random number RN. The second bits thus selected in this example are second and third bits (e.g., "10") from the right side among bits of the random number RN. The address decoder 112*a* compares the second bits selected from the random number RN with the converted address AD_C.

When a value of the converted address AD_C is different from a value of the second bits, the address decoder 112*a* selects one of the first to fourth registers 121 to 124 depending on the converted address AD_C. When the value of the converted address AD_C is identical to the value of the second bits, the converted address AD_C is determined to satisfy a dummy condition of the shuffle configuration. When the converted address AD_C satisfies the dummy condition, the address decoder 112a selects the fifth register 125 which is shown in FIG. 12 as assigned to no address (i.e., AD:NO). When the converted address AD_C is determined to not satisfy the dummy condition of the shuffle configuration, the address decoder 112a selects one of the first to fourth registers 121 to 124 as indicated by the converted address AD_C.

According to an embodiment of the inventive concepts, the data bits DB are stored into one of five registers depending on the address AD indicating one of four registers. Accordingly, the security of the data bits DB may be further improved.

The description is given in FIG. 12 as the address decoder 112a selects the fifth register 125 depending on the converted address AD_C and the second bits selected from the random number RN. However, the reference which the address decoder 112a uses to select the fifth register 125 is not limited to the converted address AD_C and the second bits selected from the random number RN.

FIG. 13 illustrates a diagram of an example in which an address is converted depending on the converted address AD_C and first bits and second bits selected from the random number RN. Referring to FIGS. 11 and 13, a shuffle configuration may have the first to fourth states S1 to S4 depending on first bits RN_XOR selected from the random number RN. The first to fourth states S1 to S4 may correspond to the first to fourth states S1 to S4 described with reference to FIG. 6.

In each of the first to fourth states S1 to S4, an exception condition EXC may be satisfied depending on second bits RN_COMP selected from the random number RN. When the exception condition EXC is satisfied, as described with reference to FIG. 12, the address decoder 112a selects the fifth register 125 regardless of the converted address AD_C.

The second bits RN_COMP may have values of "00" to "11". In the first to fourth states S1 to S4, the exception condition EXC may be satisfied when a value of the converted address AD_C is identical to a value of the second bits RN_COMP. As may be understood with reference to FIG. 13, a value of the address AD satisfying the exception condition EXC varies with the first bits RN_XOR and the second bits RN_COMP selected from the random number RN. Accordingly, the security of the data bits DB may be further improved.

In addition to the configuration described with reference to FIG. 7, the restorer 113a may be further configured to output the fifth information I5 from the fifth register 125 as one of the first to fourth restored information RI1 to RI4 when the exception condition EXC is satisfied.

Figure 14:
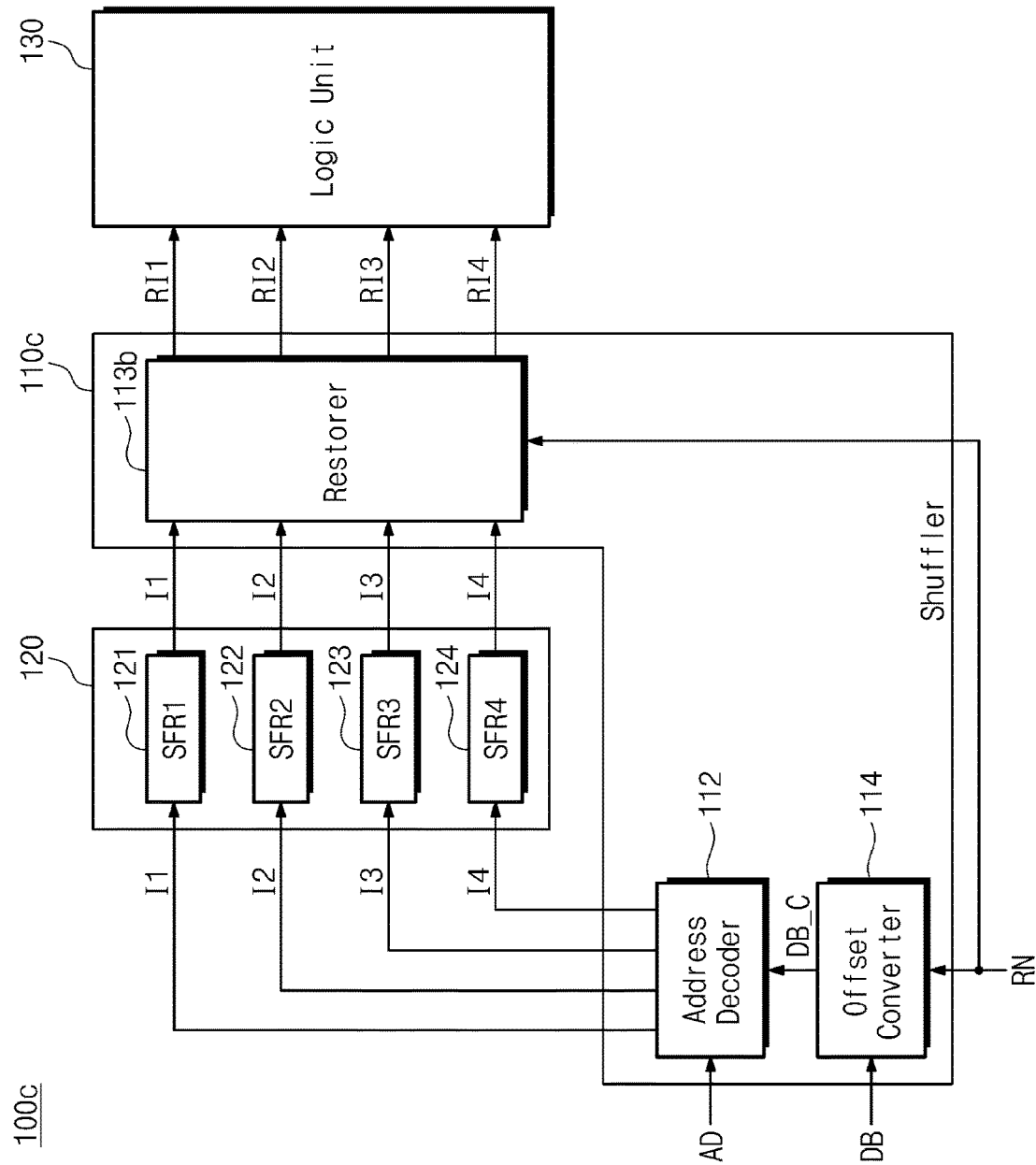
FIG. 14 illustrates a block diagram of a peripheral block according to an embodiment of the inventive concepts.

FIG. 14 illustrates a block diagram of a peripheral block 100c according to an embodiment of the inventive concepts. Referring to FIG. 14, the peripheral block 100c includes a shuffler 110c, the special function register 120, and the logic unit 130. Configurations and operations of the special function register 120 and the logic unit 130 are identical to those described with reference to FIG. 3.

The shuffler 110c includes the address decoder 112, a restorer 113b, and an offset converter 114. The offset converter 114 receives the data bits DB and the random number RN. The offset converter 114 may convert offset bits OFF of the data bits DB depending on the random number RN and may convert an order of the data bits DB depending on the converted offset bits OFF. The offset converter 114 outputs converted data bits DB_C as a result of the conversion.

The address decoder 112 receives the address AD and the converted data bits DB_C. The address decoder 112 stores the converted data bits DB_C to one of the first to fourth registers 121 to 124 depending on the address AD. The converted data bits DB_C may be stored into one of the first to fourth registers 121 to 124 as one of the first to fourth information I1 to I4.

The restorer 113b receives the random number RN. The restorer 113 transfers the first to fourth information I1 to I4 as the first to fourth restored information RI1 to RI4 to the logic unit 130 depending on the random number RN. The restorer 113b may restore offset bits of the converted data bits DB_C depending on the random number RN and may restore the data bits DB by using the restored offset bits.

Figure 15:
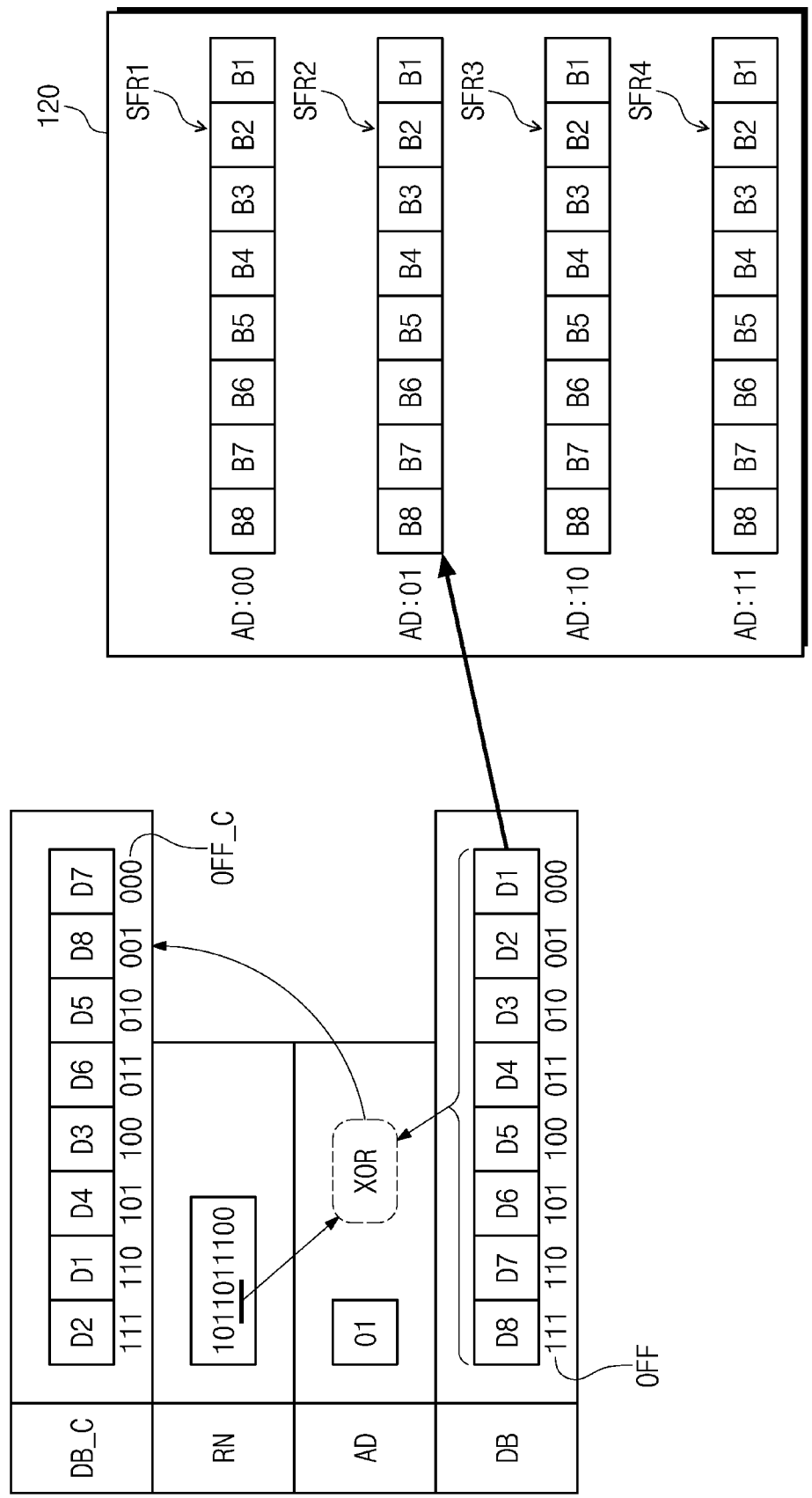
FIG. 15 illustrates a diagram of a method of storing data bits to which a shuffle configuration according to a fourth example is applied.

FIG. 15 illustrates a diagram of a method of storing the data bits DB to which a shuffle configuration according to a fourth example is applied. Referring to FIGS. 14 and 15, the offset converter 114 identifies offset bits OFF depending on positions (or orders) of the first to eighth bits D1 to D8. The offset bits OFF (i.e., first offset bits) indicate an order (i.e., first order) of the data bits DB.

The offset converter 114 in this example selects third to fifth bits from the left side among bits of the random number RN. The offset converter 114 generates converted offset bits OFF_C by performing an XOR operation on all the offset bits OFF and bits selected from the random number RN. For example, the offset converter 114 performs an XOR operation on offset bits "000" (e.g., D1) of the offset bits OFF and the bits selected from the random number (e.g., "110") to provide the converted offset data bits "110" (e.g., D1) of the converted data bits DB_C. The converted offset bits OFF_C (i.e., second offset bits) indicate an order (i.e., second order) of the converted data bits DB_C.

The offset converter 114 may generate the converted data bits DB_C by rearranging the first to eighth bits D1 to D8 depending on the converted offset bits OFF_C. In this example, as shown in FIG. 15, the converted data bits DB_C are rearranged in order from offset data bits "111" to "000" respectively corresponding to converted data bits D2, D1, D4, D3, D6, D5, D8 and D7. Since the address AD is "01", the address decoder 112 stores the converted data bits DB_C into the second register 122.

The restorer 113b receives the random number RN. The restorer 113b restore the offset bits OFF of the converted data bits DB_C of the first to fourth information I1 to I4 by using bits selected from the random number RN and restores the data bits DB depending on the restored offset bits OFF.

The embodiments described with reference to FIGS. 3 to 13 adjust target bit storages, at which the data bits DB will be stored, depending on a shuffle configuration, by adjusting registers at which the data bits DB will be stored. In contrast, the embodiment described with reference to FIGS. 14 and 15 adjusts target bit storages, at which the data bits DB will be stored, depending on a shuffle configuration, by adjusting positions of the data bits DB which will be stored in a register.

Figure 16:
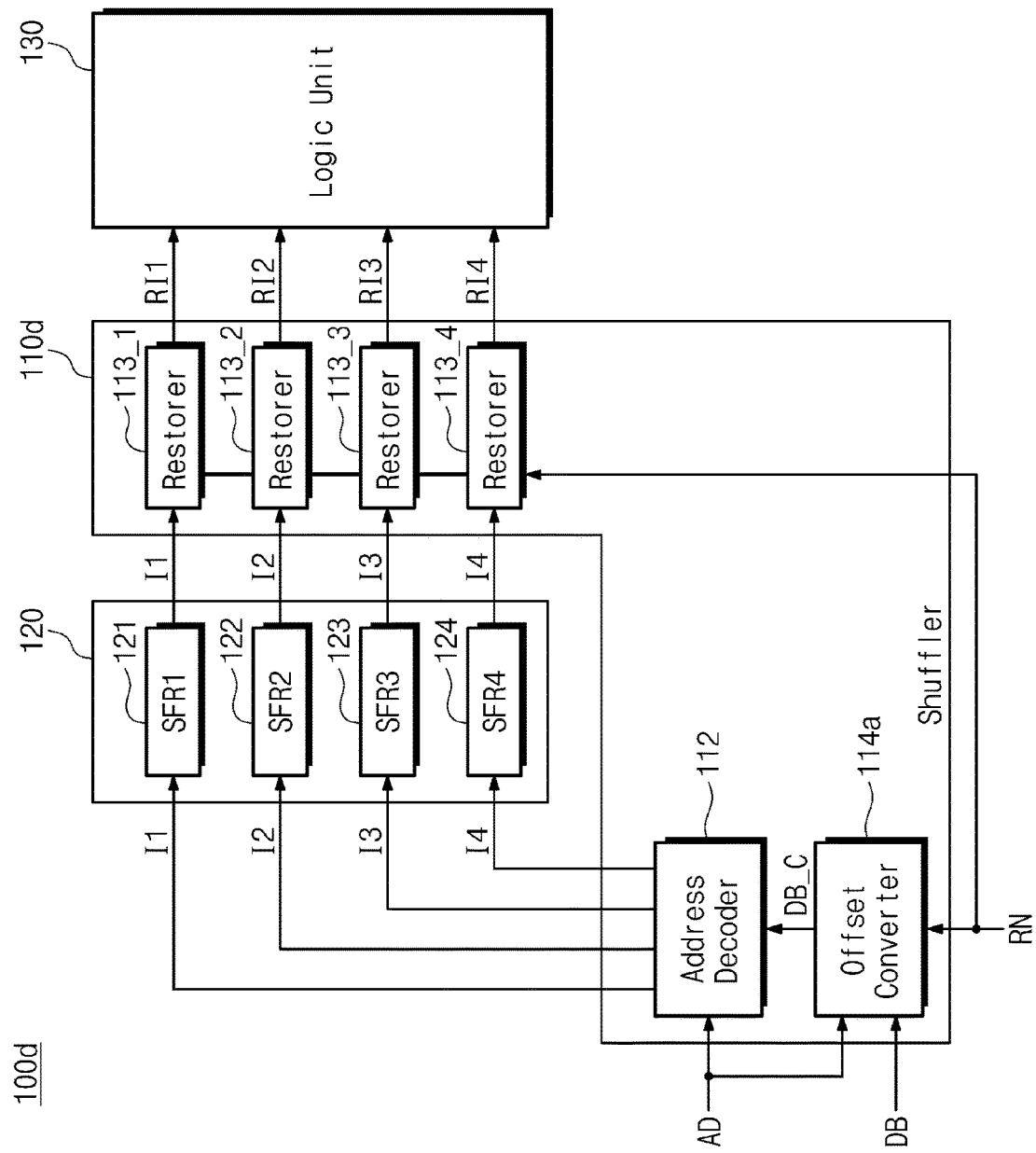
FIG. 16 illustrates a block diagram of a peripheral block according to an embodiment of the inventive concepts.

FIG. 16 illustrates a block diagram of a peripheral block 100d according to an embodiment of the inventive concepts. Referring to FIG. 16, the peripheral block 100d includes a shuffler 110d, the special function register 120, and the logic unit 130. Configurations and operations of the special function register 120 and the logic unit 130 are identical to those described with reference to FIG. 3.

The shuffler 110d includes the address decoder 112, an offset converter 114a, and first to fourth restorers 113_1 to 113_4. A configuration and an operation of the address decoder 112 are identical to those described with reference to FIG. 14.

The offset converter 114a receives the address AD, the random number RN, and the data bits DB. The offset converter 114a selects different bits of bits in the random number RN depending on the address AD. The offset converter 114a converts the data bits DB to the converted data bits DB_C depending on the bits selected from the random number RN.

The first to fourth restorers 113_1 to 113_4 receive different bits selected from the random number RN. The first restorer 113_1 receives selected bits when the address AD is "00", and the second restorer 113_2 receives selected bits when the address AD is "01". The third restorer 113_3 receives selected bits when the address AD is "10", and the fourth restorer 113_4 receives selected bits when the address AD is "11". Each of the first to fourth restorers 113_1 to 113_4 may recover offsets of the converted data bits DB_C from the corresponding register depending on the bits selected from the random number RN.

Figure 17:
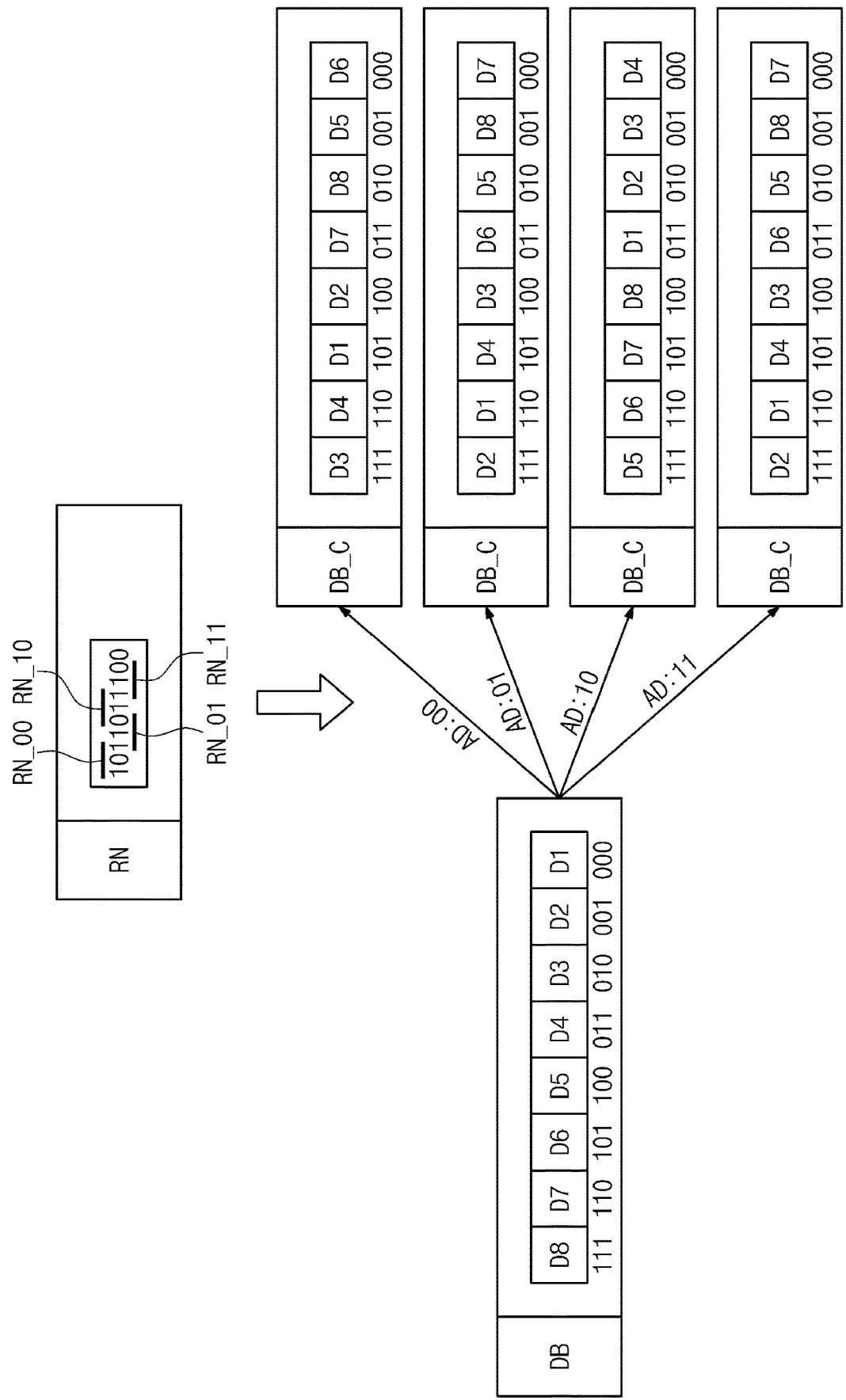
FIG. 17 illustrates a diagram of a method of storing data bits to which a shuffle configuration according to a fifth example is applied.

FIG. 17 illustrates a diagram of a method of storing the data bits DB to which a shuffle configuration according to a fifth example is applied. Referring to FIGS. 16 and 17, the offset converter 114a converts the offset bits OFF using first bits RN_00 selected from the random number RN when the address AD is "00". The offset converter 114a converts the offset bits OFF using second bits RN_01 selected from the random number RN when the address AD is "01".

The offset converter 114a converts the offset bits OFF using third bits RN_10 selected from the random number RN when the address AD is "10". The offset converter 114a converts the offset bits OFF using fourth bits RN_11 selected from the random number RN when the address AD is "11". The selected first to fourth bits RN_00 to RN_11 may be different from each other.

Similarly as described with respect to FIG. 15, the offset converter 114a generates converted data bits DB_C by performing an XOR operation on all the offset bits OFF of the data bits DB and bits selected from the random number RN. For example, when the address AD is "00", the offset converter 114a performs an XOR operation on offset bits "000" (e.g., D1) of the offset bits OFF and the bits selected from the random number (e.g., "101") to provide the converted offset data bits "101" (e.g., D1) of the converted data bits DB_C. The converted data bits DB_C are rearranged in order from offset data bits "111" to "000" respectively corresponding to converted data bits D3, D4, D1, D2, D7, D8, D5 and D6 as shown.

Since the bits of the random number RN are differently selected depending on the address AD, the data bits DB may be differently converted depending on the address AD. An example is illustrated in FIG. 17 as the arrangement orders of the first to eighth bits D1 to D8 of the converted data bits DB_C vary as the address AD varies.

The random number RN is updated when power is supplied to the integrated circuit device 10 (refer to FIG. 1) or when the integrated circuit device 10 is reset. Accordingly, when power is supplied to the integrated circuit device 10 (refer to FIG. 1) or when the integrated circuit device 10 is reset, the order in which the first to eighth bits D1 to D8 are rearranged varies with the address AD, and thus, the security of the data bits DB is further improved.

Figure 18:
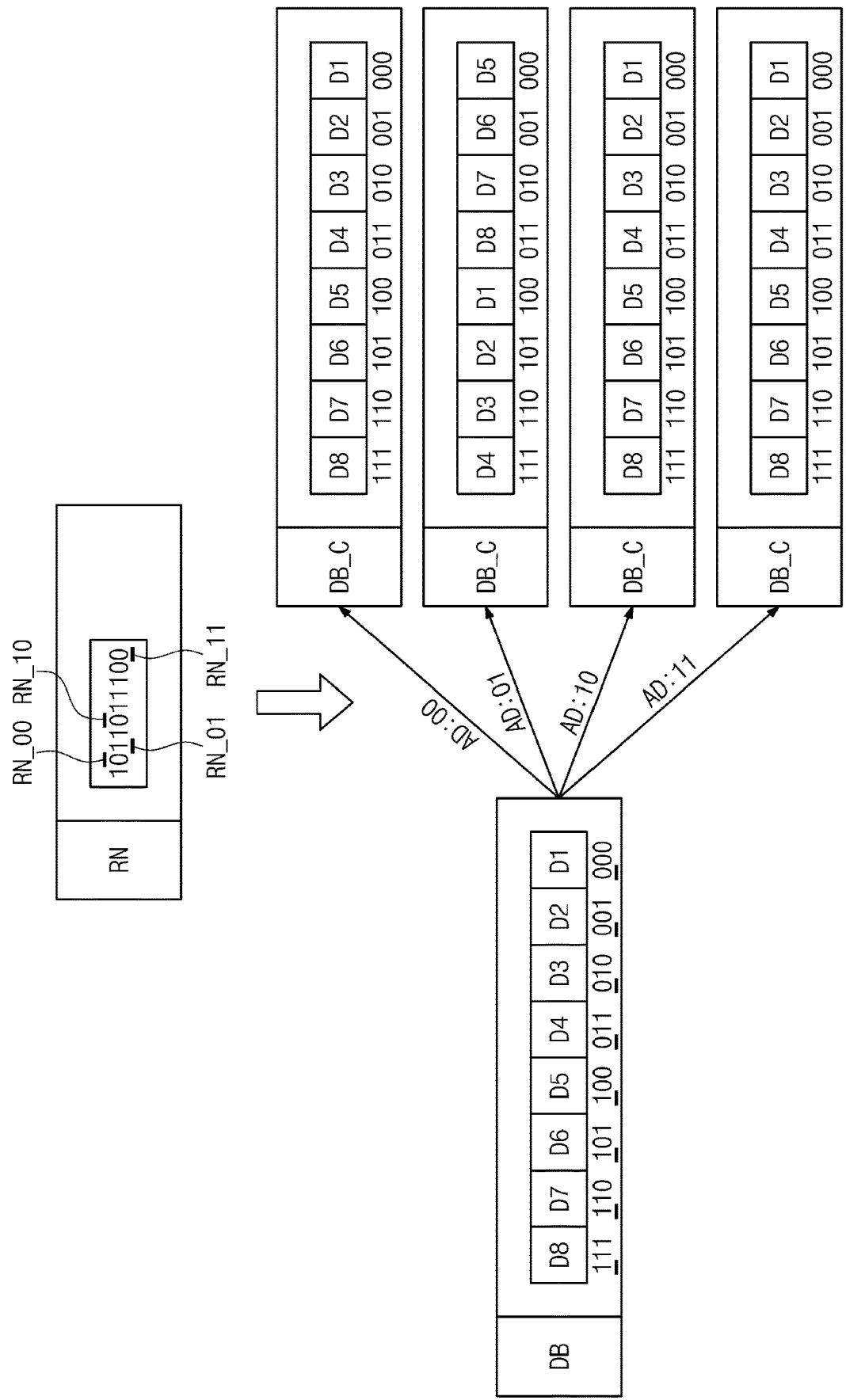
FIG. 18 illustrates a diagram of a method of storing data bits to which a shuffle configuration according to a sixth example is applied.

FIG. 18 illustrates a diagram of a method of storing the data bits DB to which a shuffle configuration according to a sixth example is applied. Compared with FIG. 17, the offset converter 114a performs an XOR operation on a part of the offset bits OFF, for example, a most significant bit. The offset converter 114a may select different bits of the random number RN as first to fourth selected bits RN_00 to RN_11 respectively. For example, if the address AD is "00", the offset converter 114a performs an XOR operation on the most significant bits of the offset bits OFF and the bit "0" of the random number RN (the second bit from the left), to provide converted data bits DB_C which are rearranged as described previously.

Compared with the shuffle configuration described with reference to FIG. 17, a shuffle configuration described with reference to FIG. 18 performs limited conversion of offset bits OFF. Compared with the offset converter 114a and the first to fourth restorers 113_1 to 113_4, which perform conversion and restoration of FIG. 17, the complexity, size, and manufacturing costs of the offset converter 114a and the first to fourth restorers 113_1 to 113_4, which perform conversion and restoration of FIG. 18, are reduced.

In an embodiment of the inventive concepts as described with reference to FIGS. 14 and 15, a limited conversion may also be applied to an example of converting the data bits DB regardless of the address AD. That is, the offset converter 114 in FIG. 14 may perform an XOR operation on at least one bit of the address AD and a bit of the random number RN.

Figure 19:
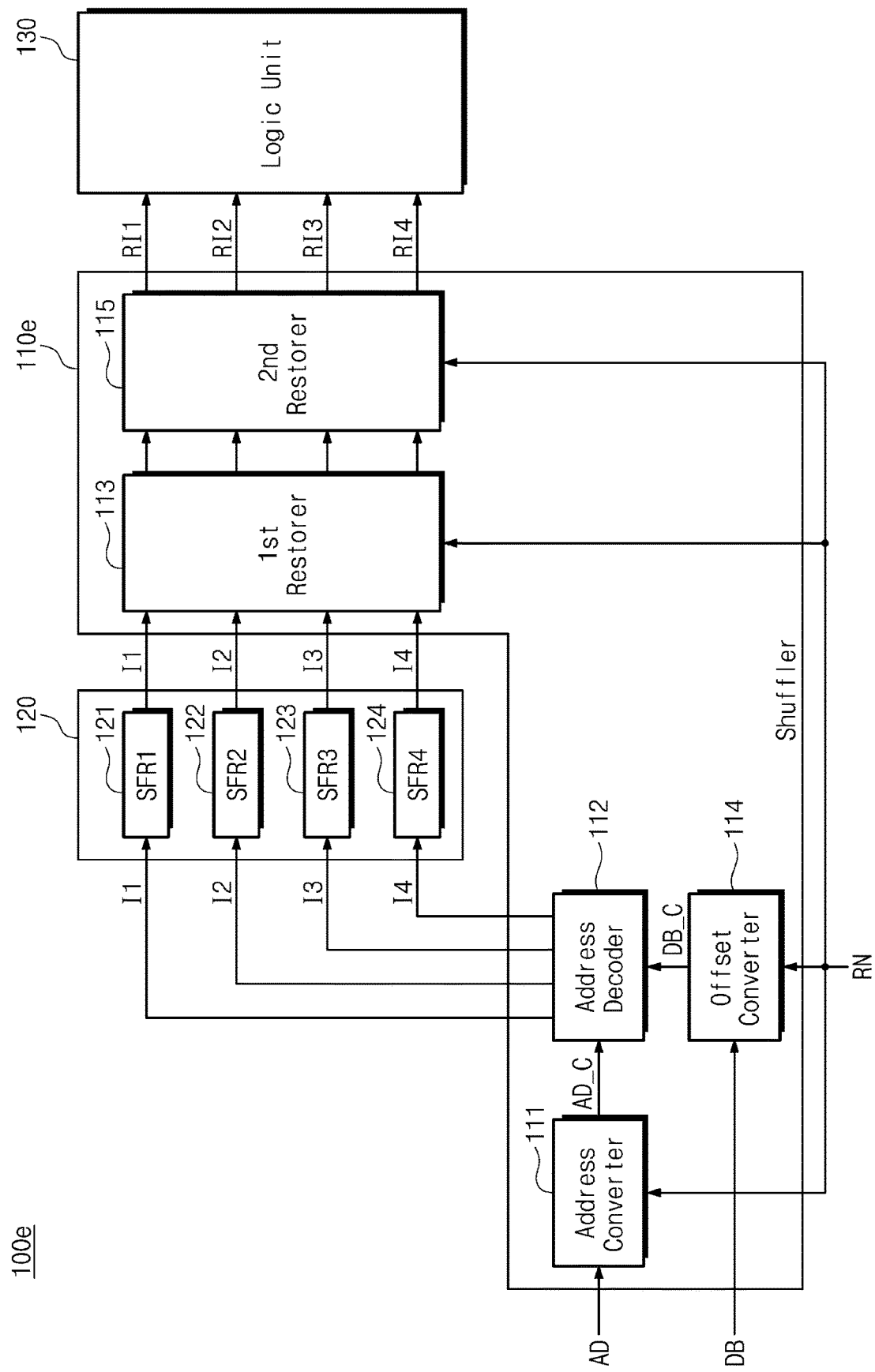
FIG. 19 illustrates a block diagram of a peripheral block according to an embodiment of the inventive concepts.

FIG. 19 illustrates a block diagram of a peripheral block 100e according to an embodiment of the inventive concepts. Referring to FIG. 19, the peripheral block 100e includes a shuffler 110e, the special function register 120, and the logic unit 130. Configurations and operations of the special function register 120 and the logic unit 130 are identical to those described with reference to FIG. 3.

The shuffler 110e includes the address converter 111, the address decoder 112, a first restorer 113, the offset converter 114, and a second restorer 115. A configuration and an operation of the address converter 111 are identical to those described with reference to FIG. 3. A configuration and an operation of the offset converter 114 are identical to those described with reference to FIG. 14.

A configuration and an operation of the address decoder 112 are identical to those described with reference to FIG. 3 except that the converted data bits DB_C are stored instead of the data bits DB. A configuration and an operation of the first restorer 113 are identical to those described with reference to FIG. 3 or 14 except that outputs of the first restorer 113 are transferred to the second restorer 115. A configuration and an operation of the second restorer 115 are identical to the first restorer 113 described with reference to FIG. 3 or 14 except that inputs are transferred from the first restorer 113.

The shuffler 110e may adjust target bit storages, to which the data bits DB will be stored, depending on a shuffle configuration by converting the address AD and rearranging the data bits DB.

The address converter 111 and the offset converter 114 may select different bits of the random number RN. The first restorer 113 may select bits of the random number RN at the same position as the address converter 111 or the offset converter 114. The second restorer 115 may select bits of the random number RN at the same position as the offset converter 114 or the address converter 111.

Figure 20:
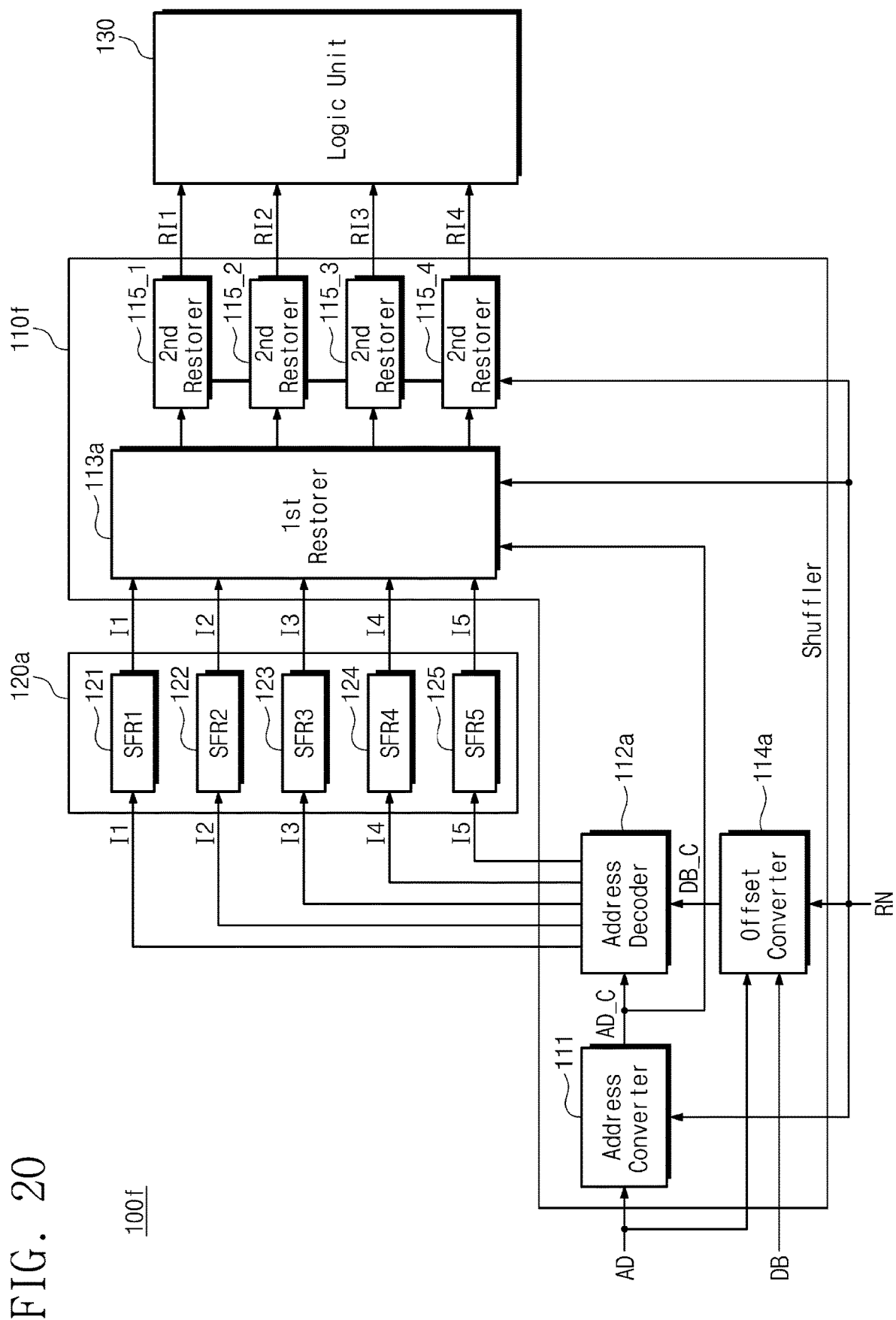
FIG. 20 illustrates a block diagram of a peripheral block according to an embodiment of the inventive concepts.

FIG. 20 illustrates a block diagram of a peripheral block 100f according to an embodiment of the inventive concepts. Referring to FIG. 20, the peripheral block 100f includes a shuffler 110f, the special function register 120a, and the logic unit 130. Configurations and operations of the special function register 120a and the logic unit 130 are identical to those described with reference to FIG. 11.

The shuffler 110f includes the address converter 111, the address decoder 112a, the first restorer 113a, the offset converter 114a, and second restorers 115_1 to 115_4. A configuration and an operation of the address converter 111 are identical to those described with reference to FIG. 3. A configuration and an operation of the offset converter 114a are identical to those described with reference to FIG. 16.

A configuration and an operation of the address decoder 112a are identical to those described with reference to FIG. 11 except that the converted data bits DB_C are stored instead of the data bits DB. A configuration and an operation of the first restorer 113a are identical to the first restorer 113 described with reference to FIG. 3, except that outputs of the first restorer 113a are transferred to the second restorers 115_1 to 115_4.

Configurations and operations of the second restorers 115_1 to 115_4 are identical to those of the first to fourth restorers 113_1 to 113_4 described with reference to FIG. 16, except that inputs are transferred from the first restorer 113a.

The shuffler 110f may adjust target bit storages, to which the data bits DB will be stored, depending on a shuffle configuration by converting the address AD and rearranging the data bits DB. Target bit storages may be selected from bit storages, the number of which is greater than the number of bit storages identified by the address AD.

In the above-described embodiments, components according to embodiments of the inventive concepts are referred to by using the term "block". A "block" may be implemented with various hardware devices, such as an integrated circuit, an application specific IC (ASCI), a field programmable gate array (FPGA), and a complex programmable logic device (CPLD), software, such as firmware and applications driven in hardware devices, or a combination of a hardware device and software. Also, a "block" may include circuits or intellectual property (IP) implemented with semiconductor devices of the IC.

According to the inventive concepts, locations at which data bits will be stored are specified by a shuffle configuration, and the shuffle configuration is adjusted when a reset operation is performed. Accordingly, an integrated circuit device which transfers or receives data bits with improved security and an operating method of the integrated circuit device are provided.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. An integrated circuit device comprising:
   registers each including two or more bit storages;
   a shuffler configured to:
      receive data bits and an address indicating one of the registers,
      select target bit storages from among bit storages of the registers based on a shuffle configuration and the address,
      store the data bits into the target bit storages, and
      transfer the data bits from the target bit storages based on the shuffle configuration; and
   a logic unit configured to receive the data bits transferred from the shuffler and to encrypt or decrypt data using the data bits as a key, wherein:
   the shuffler is configured to adjust the shuffle configuration when a reset operation is performed, and
   the shuffler comprises:
      an address converter configured to receive the address and to generate a converted address from the address based on the shuffle configuration;
      an address decoder configured to select first bit storages of a first register, which is not assigned to a range of the address, from among the registers as the target bit storages when the converted address satisfies a dummy condition of the shuffle configuration, to select second bit storages of a second register, indicated by the converted address, from among the registers as the target bit storages when the converted address does not satisfy the dummy condition, and to transfer the data bits to the target bit storages; and
      a restorer configured to transfer the data bits from one of the first register and the second register to the logic unit based on the shuffle configuration.

2. The integrated circuit device of claim 1, wherein:
   the shuffle configuration includes a random number including two or more bits, and
   the address converter is configured to generate the converted address from the address by performing an exclusive OR operation on first bits of the random number and the address.

3. The integrated circuit device of claim 1, wherein:
   the shuffle configuration includes a random number including two or more bits, and
   the address converter is configured to generate the converted address by performing an exclusive OR operation on at least one first bit of the random number and at least one second bit of bits of the address.

4. The integrated circuit device of claim 1, wherein:
   the shuffle configuration includes a random number including two or more bits, and
   the address converter is configured to generate the converted address from the address by performing an exclusive OR operation on first bits of the random number and the address and to determine that the dummy condition is satisfied when a value of the converted address matches a value of second bits of the random number.

5. The integrated circuit device of claim 4, wherein:
   the logic unit includes inputs respectively corresponding to the range of the address, and
   the restorer is configured to select one of the first register and the second register to be connected to an input of the inputs based on the dummy condition.

6. The integrated circuit device of claim 1, wherein the shuffler further comprises:
   an offset converter configured to generate converted data bits by rearranging the data bits, which are arranged in a first order, in a second order based on the shuffle configuration, wherein:
   the address decoder is further configured to transfer the converted data bits to the target bit storages as the data bits, after the rearranging, and
   the restorer is further configured to restore the data bits, before the rearranging, from the target bit storages based on the shuffle configuration and to transfer the data bits to the logic unit.

7. The integrated circuit device of claim 1, wherein:
   the shuffle configuration includes a random number, and
   the random number is newly generated when the reset operation is performed.

8. An operation method of an integrated circuit device which includes registers, a shuffler, and a logic circuit, the method comprising:
   receiving, by the shuffler, a random number generated in response to a reset signal;
   receiving, by the shuffler, an address and data bits;

selecting, by the shuffler, bit storages of first registers of the registers as target bit storages based on the random number and the address in response to satisfying a dummy condition;

selecting, by the shuffler, bit storages of second registers of the registers as the target bit storages based on the random number and the address in response to not satisfying the dummy condition, the second registers being different from the first registers;

storing, by the shuffler, the data bits into the target bit storages;

transferring the data bits from the target bit storages of the shuffler to the logic circuit; and encrypting or decrypting, by the logic circuit, data using the data bits as a key.

9. The method of claim 8, wherein the transferring is performed based on the random number and the dummy condition.

10. An integrated circuit device comprising:

registers each including two or more bit storages;

a shuffler configured to:
  receive data bits and an address indicating one of the registers,
  select target bit storages from among bit storages of the registers based on a shuffle configuration and the address,
  store the data bits into the target bit storages, and
  transfer the data bits from the target bit storages depending on the shuffle configuration; and a logic unit configured to receive the data bits transferred from the shuffler and to encrypt or decrypt data using the data bits as a key, wherein:

the shuffler is configured to adjust the shuffle configuration when a reset operation is performed and the shuffler comprises:

an offset converter configured to generate converted data bits by rearranging the data bits, which are arranged in a first order, in a second order depending on the shuffle configuration;

an address decoder configured to select bit storages of a register, indicated by the address, from among the registers as the target bit storages and to transfer the converted data bits to the target bit storages; and a restorer configured to restore the converted data bits from the register indicated by the address to the data bits based on the shuffle configuration and to transfer the data bits to the logic unit, the shuffle configuration includes a random number including two or more bits, and the offset converter is configured to:
  generate second offset bits that indicate the second order by performing an exclusive OR operation on at least one of first offset bits that indicate the first order of the data bits and at least one first bit of the random number, and
  generate the converted data bits from the data bits by rearranging the data bits based on the second offset bits.

11. The integrated circuit device of claim 10, wherein:

the shuffle configuration includes a random number including two or more bits, and the offset converter is configured to generate the second offset bits that indicate the second order by performing the exclusive OR operation on the first offset bits and first bits of the random number, the first bits including the at least one first bit.

12. The integrated circuit device of claim 10, wherein the offset converter is configured to select the at least one first bit of the bits of the random number based on the address.

\* \* \* \* \*